United States Patent [19]

Gonzalez et al.

[11] Patent Number: 5,104,968
[45] Date of Patent: Apr. 14, 1992

[54] POLYIMIDE PRECURSOR COMPOSITION AND APPLICATION THEREFROM

[75] Inventors: Serge Gonzalez, Decines; Paul Mariaggi, Seyssuel; Guy Rabilloud, Grenoble; Bernard Sillion, Lyon, all of France

[73] Assignee: Centre D'Etude Des Materiaux Organiques Pour Technologies Avancees, France

[21] Appl. No.: 564,236

[22] Filed: Aug. 8, 1990

[30] Foreign Application Priority Data

Aug. 8, 1989 [FR] France .................. 89 10757

[51] Int. Cl.$^5$ .................. C08G 69/12; C08G 73/12
[52] U.S. Cl. .................. 528/322; 428/411.1; 528/315; 528/316; 528/317; 528/318; 528/331
[58] Field of Search .............. 528/322, 317, 331, 315, 528/316, 318

[56] References Cited

U.S. PATENT DOCUMENTS 3,609,123 9/1971 Rabilloud et al. .............. 260/47 CP
4,720,539 1/1988 Rabilloud et al. .................. 528/353

FOREIGN PATENT DOCUMENTS 251828 1/1988 European Pat. Off. .

*Primary Examiner*—Harold D. Anderson
*Attorney, Agent, or Firm*—Millen, White & Zelano

[57] ABSTRACT

Polyimide precursor compositions incorporating at least one compound of formula (1), at least one compound of formula (2), at least one compound of formula (3) and at least one compound of formula (4)

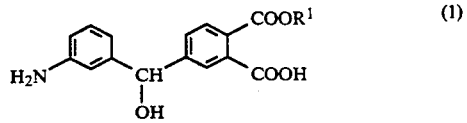

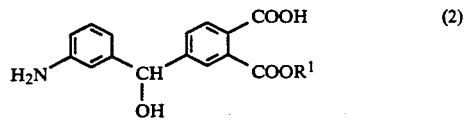

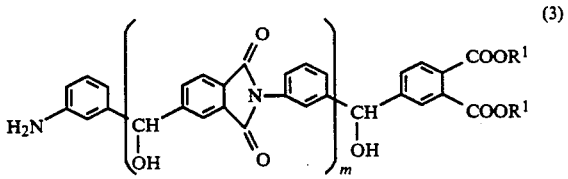

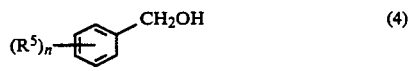

in which one of the groups $R^3$ and $R^4$ represents a hydrogen atom and the other, in the same way as the groups $R^1$ and $R^2$, which can be the same or different, in each case represent a hydrocarbon group having 1 to 16 carbon atoms, m is a number between 5 and 20, n is an integer between 1 and 5 and $R^5$ represents a hydrogen atom, a halogen atom, a hydrocarbon group with 1 to 16 carbon atoms, or a group of formula $R^6$—O— in which $R^6$ represents a hydrocarbon group having 1 to 16 carbon atoms. The preferred composition contains 30 to 70% by weight of dry matter of compounds of formulas (1), (2) and (3), in which the groups $R^1$, $R^2$ and one of the groups $R^3$ and $R^4$ is a methyl or ethyl group and the compound of formula (4) is benzyl alcohol. These compositions are usable as smoothing and/or protective coatings for metals, metal alloys or other substrates and in particular in the electrical and electronic industries, e.g. for the formation of dielectric films.

9 Claims, No Drawings

POLYIMIDE PRECURSOR COMPOSITION AND APPLICATION THEREFROM

BACKGROUND OF THE INVENTION

The present invention relates to polyimide precursor compositions and their uses, particularly for producing insulating coatings, dielectric films, smoothing coatings, protective coatings and for numerous applications in the electrical and electronic industries. It more particularly relates to compositions formed by preparing a mixture of autocondensable oligomers and monomers, precursors of thermostable polyimides, with at least one compound having a hydroxyl function chosen within the group of hydroxylated compounds defined hereinafter.

These compositions or solutions of these compositions in a solvent or a mixture of solvents have the advantage of being much more stable than the conventional polyimide precursor solutions, which are generally polyamid-acids. The latter are very sensitive to any temperature rise, so that it is preferable for them to be kept at below 5° C., as well as to the presence of humidity, which deteriorates the polymer as a result of the hydrolysis of the amid-acid groups. However, the compositions according to the invention are remarkably stable and they can be stored for several months at ambient temperature without any significant changes to the characteristics of these polyimide precursor solutions compared with their initial characteristics.

The invention also relates to the use of these compositions and in particular their use for producing insulating coatings, especially for protecting metals such as iron, steel, aluminium, copper, brass, nickel plated copper, metal alloys, titanium or other substrates, e.g. semiconductor substrates such as silicon, germanium and gallium arsenide. It also relates to the use of these compositions for the production of smoothing layers, especially in the production of integrated circuits or multi-layer interconnection systems.

The compositions according to the invention are particularly suitable for the latter applications making use of dielectric layers or films, whose function is to separate several metallic interconnection levels. For example, the upper structure of an integrated semiconductor circuit can have two interconnection levels. A first layer of conductor elements, e.g. polysilicon, aluminium or tungsten is deposited on the surface of the semiconductor. A dielectric insulating film is then deposited on this first interconnection level. Contact holes are made in the dielectric layer at clearly defined points of the circuit. The second interconnection level is produced by forming a metallic film, e.g. by high temperature evaporation and by etching in said film conductor lines using conventional etching methods. A final insulating film can be added in order to protect the integrated circuit against any contamination by external agents.

The surface of an integrated circuit is not planar, because the active elements are produced by a number of successive etching and deposition operations. It therefore has a plurality of relief or step elements and cavity or trench elements. It is particularly important that the dielectric film deposited on said irregular surface can cover the steps and fill the trenches giving a surface which is as planar as possible. The degree of smoothing as defined by L. B. Rothman (Journal of Electrochemical Society 1980, 127, pp. 2116-2120) is calculated with the aid of the following formula $$\epsilon = 1 - h_2/h_1$$

in which $\epsilon$ represents the degree of smoothing, $h_1$ the initial height of an e.g. metallic step and $h_2$ the level difference obtained above said same step following the deposition of the insulating layer. This formula shows that if the final surface is perfectly planar, i.e. $h_2=0$, we obtain $\epsilon=1$. However, if the final step height is equal to the height of the initial step ($h_1=h_2$), there has been no smoothing and $\epsilon$ is equal to 0. Therefore the degree of smoothing $\epsilon$ varies between 0 and 1 and the closer the smoothing coefficient to 1 the more planar the final surface.

One of the methods used for producing insulating layers consists of using polyimide resins or polyimide precursors such as acid polyamides. Examples of such products are the product marketed by Hitachi Chemical Co. under reference PIQ 13 or the series of products marketed by Du Pont de Nemours under the name Pyralins. These polymers have excellent film forming characteristics, good dielectric properties and an excellent thermal stability. However, their smoothing power, which is generally between 0.15 and 0.4 is relatively poor. One of the reasons is that the polymer concentration in these solutions is usually below 20% by weight, because beyond this value the dynamic viscosity of the solutions is too great for them to be usable for depositing thin films, e.g. having a thickness below 2 micrometers ($\mu$m).

In most applications, the dielectric films are deposited on semiconductors by rotation using a spinner. Under these conditions, it has been shown (S. A. Jenekhe, "Polymers for High Technology", ACS Symposium Series, Vol. 346, 1987, p. 261) that the smoothing power of a polymer solution is governed by numerous parameters such as the deposited solution volume, the solvent volatility, the polymer concentration, the temperature, the solution viscosity, the rotation speed of the spinner, the rotation time and the behaviour of the polymer during the final treatment of drying and baking. One of these parameters, the dry matter concentration, plays a particularly important part in the smoothing power. This phenomena has been revealed with polyimides or polymethyl methacrylate (D. B. La Vergne and D. C. Hofer, SPIE 1985 Vol. 539 "Advances in Resist Technology and Processing II", p. 115). This observation was confirmed by L. E. Stillwagon (Solid State Technology, June 1987, p. 67) by comparing conventional resins with a liquid cycloaliphatic epoxide used without a solvent. The latter compound makes it possible to obtain a very high smoothing level of approximately 0.7 to 0.9. However, phenolic or epoxy resins are only usable as production aids, because they do not have an adequate thermal stability to withstand high temperature metallization operations.

At present, only thermostable heterocyclic polymers and in particular polyimides and polyphenyl quinoxalines can be used as intermetallic dielectrics. It has already been stated that the upper limit of the dry matter concentration in conventional acid polyamide solutions, the precursors of polyimides, was approximately 20%. In order to improve the smoothing characteristics of polyimides, it is indispensable to increase the polymer concentration in order to achieve a maximum value.

Solutions with a higher polyimide precursor polymer concentration have been prepared either by using a delay reagent (U.S. Pat. No. 4,720,539) or by preparing oligomers with a low molecular weight replacing, in the synthesis of the polyimides, the tetracarboxylic aromatic acid dianhydrides by bis(ortho-acid esters), which are much less reactive (European Patent 251,828). These methods make it possible to obtain dry matter concentrations of approximately 30%, but the quality of the films prepared according to the latter method is below that of films obtained from conventional high molecular weight polyamid-acids. One of the reasons is that most of the polycondensation reaction must be performed in the solid phase, following the evaporation of the solvent and that the mobility of the molecules is no longer adequate for ensuring that the antagonistic reactive centers have a high probability of meeting.

SUMMARY OF THE INVENTION

It has been found and this is one of the objects of the invention, that certain compositions, prepared by mixing autocondensable monomers forming precursors of polyimides with autocondensable oligomers from the partial prepolycondensation of said monomers and a liquid organic compound carrying a hydroxyl function and defined hereinafter, had remarkable smoothing properties.

These compositions have a very high dry matter content, normally approximately 30 to approximately 70% by weight, a dynamic viscosity suitable to deposition by rotation or screen process printing and viscoelastic state creep characteristics making it possible to carry out a viscoplastic phase or solid phase polycondensation under good conditions. The preparation of the polyimide precursor compositions according to the invention uses as the starting product a mixture of two autocondensable isomeric monomers, whose synthesis is e.g. described in U.S. Pat. No. 3,609,123 and whose general formulas (1) and (2) are described hereinafter. The monomers of formulas (1) and (2) are soluble in numerous polar organic solvents, such as e.g. in dimethyl formamide, dimethyl acetamide, N-methyl pyrrolidone, dimethyl sulphoxide, dioxan, diglyme or mixtures of these solvents. However, in most cases, these solvents do not make it possible to prepare good quality films, either because the oligomers precipitate as from the start of the reaction, or because the plastification of the polyimide precursors by the solvent is not adequate to give flexible, elastic films.

It has surprisingly been discovered that certain compounds carrying hydroxyl functions such as benzyl alcohol and alcohols of the benzyl type were not only good solvents of the mixture of monomers of formulas (1) and (2) and oligomers of formula (3), but also facilitated the prepolycondensation reaction in solution of said monomers and the subsequent solid phase or viscoplastic phase polycondensation reaction to give dielectric films having an excellent cohesion and free from structural defects.

Within the scope of the present invention it has been found that the mixture of monomers (1) and (2) with the oligomers (3) is soluble in benzyl alcohol, whilst the average molecular weight of the oligomers remains relatively low. Surprisingly, it is the mixing of the three types of compounds which leads to time-stable solutions. Thus, when the monomers (1) and (2) are dissolved in benzyl alcohol, e.g. by a short heating at a moderate temperature of e.g. between 50° and 80° C., the solution obtained remains clear only for a few days. This is followed by the reprecipitation of the monomers in the form of a light beige pulverulent solid. However, when the monomers are associated with a certain proportion of oligomers of formula (3), the solutions remain stable for several months at ambient temperature. More specifically, the present invention relates to polyimide precursor compositions comprising:

a) at least one compound of general formula:

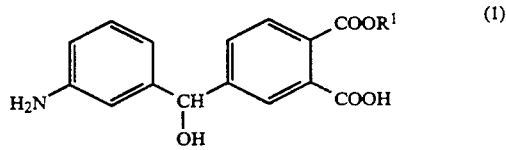

(1)

in which $R^1$ represents a hydrocarbon group with 1 to 16 carbon atoms, preferably 1 to 12 carbon atoms and usually 1 to 4 carbon atoms, b) at least one compound of general formula

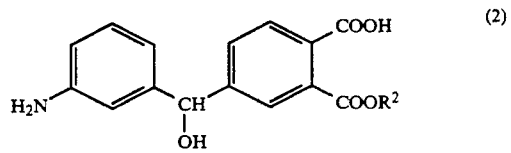

(2)

in which $R^2$ stands for a hydrocarbon group with 1 to 16 carbon atoms, preferably 1 to 12 carbon atoms and usually 1 to 4 carbon atoms, c) at least one so-called autocondensable oligomer compound normally obtained by the partial prepolycondensation of at least one monomer of formula (1) and/or (2) and having the general formula

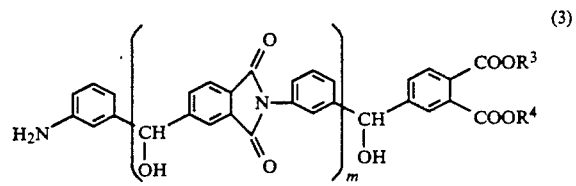

(3)

in which m represents a number from 5 to 20, preferably 6 to 18 and usually 7 to 15, one of the groups $R^3$ and $R^4$ represents a hydrogen atom and the other represents a hydrocarbon group having 1 to 16 carbon atoms, preferably 1 to 12 carbon atoms and usually 1 to 4 carbon atoms and d) at least one hydroxylated compound of general formula

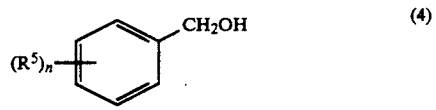

(4)

in which n is an integer from 1 to 5, preferably 1 or 2 and usually 1, $R^5$ represents a hydrogen atom, a halogen atom (chlorine, bromine, iodine or fluorine), a hydrocarbon group having 1 to 16, preferably 1 to 12 and usually 1 to 4 carbon atoms or a group of formula $R^6$—O— in which $R^6$ stands for a hydrocarbon group with 1 to 16, preferably 1 to 12 and usually 1 to 4 carbon atoms.

In the general formula (3), m represents the degree of polycondensation, which can e.g. be determined by the standard analytical methods such as permeable gel exclusion chromatography.

The preferred polyimide precursor compositions are those in which in the compounds of general formulas (1), (2) and (3) the groups $R^1$, $R^2$ and one of the groups $R^3$ or $R^4$ in each case represents the same hydrocarbon group and in particular those in which said group has 1 to 4 carbon atoms. Usually the hydrocarbon groups $R^1$, $R^2$, one of the groups $R^3$ or $R^4$, and $R^6$ and $R^5$, when the latter represents a hydrocarbon group, are straight or branched-chain alkyl groups. Examples of such alkyl groups are methyl, ethyl, propyl, isopropyl, n-butyl, 1-methyl propyl, 2-methyl propyl and tert. butyl. In preferred manner, the polyimide precursor compositions comprise the compounds of formulas (1), (2) and (3) in which $R^1$, $R^2$ and one of the $R^3$ or $R^4$ are identical and are in each case a methyl or ethyl group.

In the preferred polyimide precursor compositions, the compound of formula (4) is chosen from the group of compounds constituted by benzyl alcohol, 2-methyl and 3-methyl, 4-isopropyl, 4-methoxy and 2-chloro benzyl alcohols. The polyimide precursor compositions according to the present invention can also comprise at least one organic liquid compound, other than the benzyl alcohol or alcohols of formula (4), normally chosen in the group constituted by alcohols, ether alcohols, ketones, esters, amides, heterocyclic compounds, hydrocarbons, halogenated hydrocarbons and phenols substituted or not substituted by hydrocarbon groups having 1 to 16 carbon atoms and/or halogens. The organic compound or compounds represent maximum 70% by weight, based on the weight of the compound (4) contained in the composition, normally 1 to 70 and preferably 5 to 30% by weight.

Examples of these compounds are in the case of the alcohols: methanol, ethanol, propanol; for the ether alcohols: methoxyethanol, 1,2-dimethoxy ethane or diglyme and 2-ethoxyethanol or cellosolve; for the ketones: acetone, methyl ethyl ketone and acetophenone; for the esters: ethylacetate and ethylbenzoate; for the amides: dimethyl formamide and dimethyl acetamide; for the heterocylic compounds: N-methyl pyrrolidone, caprolactam and butyrolactone; for the hydrocarbons and chlorinated hydrocarbons: toluene, xylene and chlorobenzene; and for the phenols: cresols, xylenols and monochlorophenols.

In the compositions according to the invention prepared with said liquid organic compound or compounds, preference is usually given to the addition thereof after forming the composition containing compounds (1), (2), (3) and (4).

The polyimide precursor compositions according to the invention can e.g. be prepared according to two methods. The first method consists of dissolving at a temperature preferably below 150° C., the monomers of formulas (1) and (2) by stirring said solid compounds in the solvent of formula (4). The choice of a temperature below 150° C. is dictated by the fact that above said temperature, the polycondensation reaction of the monomers is usually too fast for it to be possible to easily control the formation of the low molecular weight oligomers used as a binder for the subsequent phase of producing films.

The preferred heat treatment for the invention e.g. consists of a heating for approximately 1 to 3 hours at a temperature of approximately 100° C., followed by heating for approximately 1 to 2 hours at a temperature of approximately 120° C. At the end of this oligomerization reaction, the solution normally contains approximately 50 to approximately 90% by weight in dry matter of the mixture of monomers (1) and (2) and approximately 50 to approximately 10% by weight of oligomers of formula (3).

The optimum proportion of oligomers of formula (3) can vary, as indicated hereinbefore, from approximately 10 to approximately 50% and is usually approximately 15 to 40% by weight. When the oligomer content value drops below approximately 10%, the compositions or solutions of these compositions have a less satisfactory time stability. It has been found that monomers (1) and (2) only form a time-stable solution, e.g. several weeks, if they are associated with a certain proportion of oligomers (3). If the proportion of oligomers (3) is below approximately 10%, e.g. if it is approximately 3 to 8%, after a few days reprecipitation occurs. Therefore it is desirable if it is wished to obtain a solution stability lasting several months to remain within the oligomer (3) concentration range referred to hereinbefore. If the oligomer (3) concentration is too high, e.g. if it is above approximately 50%, the medium becomes extremely viscous and it is no longer possible to have a high dry matter concentration.

The second method for preparing compositions according to the invention consists of carrying out in a first stage an oligomerization of the monomers (1) and (2), e.g. within a polar solvent, normally by heating, e.g. for approximately 7 to 15 hours at a temperature of approximately 120° C., so as to prepare a mixture of oligomers of general formula (3) preferably having an average degree of polycondensation of 7 to 15.

This mixture of oligomers can be isolated by precipitation in a non-solvent medium such as hexane, water or methanol and added in predetermined proportions to the solvent of formula (4) containing the monomers of formulas (1) and (2). In the compositions according to the invention, the compounds of general formulas (1) and (2) are normally present in quantities such that the weight ratio of the quantity of compound (1) to that of compound (2) is approximately 0.6:1 to approximately 1.5:1 and usually approximately 0.9:1 to approximately 1.1:1.

The final solution obtained by one of these methods is then normally filtered on a filter cartridge, which holds back all the particles with a diameter greater than 5 μm. A second filtration on a so-called absolute filter makes it possible to eliminate the particles with a diameter greater than 0.2 μm.

The total quantity of the mixture formed by the monomers of formulas (1) and (2) and oligomers of formula (3) which is dissolved is a function of the intended application, but in order to obtain the best smoothing properties, it is normally preferable to prepare solutions containing a minimum of 30% by weight dry matter and preferably approximately 40 to approximately 50% thereof. It is the application which conditions the thickness of the insulating film and the latter is dependent both on the monomer concentration and the procedure used. In general terms, the thin films e.g. having a thickness below 5 μm are prepared from solutions having a dry matter concentration of approximately 30 to 55% by weight. The coatings having a thickness greater than 5 μm can be produced by using solutions, whose monomer concentration can reach 70% by weight.

The process for using the compositions according to the invention consists of depositing a wet film from a solution, whose concentration and viscosity have been adjusted in order to adapt to the coating system, e.g. spinner, doctor or spraying and then the film is heated by an appropriate heat treatment. The latter is normally performed in stages so as to progressively evaporate the solvent and make the polycondensation reaction advance under optimum conditions. The first heating stage is normally carried out at a temperature of approximately 90° to 120° C. for approximately one hour and this leads to a regular, flexible film constituted by polyimide oligomers usually having a number average molecular weight of approximately 2000 to 4000 and usually retaining approximately 10 to 15% of highly associated solvent. It can be assumed that this molecular association between the solvent and the polymer being formed is partly responsible for the film forming characteristics of the compositions according to the invention.

The second baking stage is normally carried out at above 150° C. and preferably at around 200° C. in order to continue the evaporation of the solvent and the polycondensation reaction. The treatment time lasts approximately 30 minutes to approximately 2 hours and leads to a polybenzhydrolimide normally having a number average molecular weight exceeding 5000. These two successive heat treatments are carried out at a temperature below the glass transition point of the final polybenzhydrolimide and usually at approximately 230° to 250° C.

It is known that the smoothing properties of a resin can be improved by a heat treatment, even if it only allows a small outflow of the polymerized product. For this purpose it is necessary to heat the polyimide to a temperature well above its glass transition point. The polymer is then in a viscoplastic state and the smoothing level improves by the flow of the polymer on the topography of the substrate. Thus, the final stage normally consists of heating between approximately 300° and 400° C., under air or an inert atmosphere for approximately 30 to approximately 60 minutes. At the end of this heat treatment the polyimide has become insoluble in polar organic solvents.

The invention also relates to the use of these compositions in all electronics and microelectronics fields where it is necessary to produce dielectric films more particularly having improved smoothing properties compared with the prior art polyimides, as well as the use of these compositions as insulating coatings for the protection of metals, like those referred to hereinbefore, metallic alloys or other substrates and in particular semiconductors, such as e.g. silicon, germanium, gallium arsenide and indium phosphide. The invention will be described in greater detail in conjunction with the specific examples hereinafter, in which the details are given in an illustrative and non-limitative manner. In these examples, the preparation of the polyimide precursor compositions is carried out accompanied by stirring and in an inert atmosphere. The final filtering of the solutions is carried out in a white room. In these examples, the dry substance concentrations are given as a percent by weight. The dynamic viscosities of the solutions are measured at 25° C. with a Haake-Rotovisco viscosimeter equipped with a cone and plate measuring system. The storage stability of the solutions is determined by the variation of the viscosity of the solutions as a function of time at ambient temperature or at a lower temperature in a refrigerator.

The characteristics of the insulating films are determined on silicon wafers with a diameter of approximately 10 cm (4 inch). The formation of imide cycles is followed by infrared spectroscopy with Fourier transform and by measuring the dissolving rate in a conventional basic developer solution. The number average molecular weights are measured by gel permeation chromatography using a true internal calibration made possible by the fact that the reaction successively gives a complete series of oligomers, dimer, trimer, tetramer, etc., perfectly separated by gel permeation chromatography. The glass transition point of the polymers is measured by penetrometry thermomechanical analysis. The thermal stability is determined by dynamic thermogravimeteric analysis with a temperature jump of 5° C. per minute in an inert atmosphere (argon) or in air.

In examples 1 to 25, the monomers of formulas (1) and (2) used are those in which $R^1$ and $R^2$ represent a methyl group and the oligomers of formula (3) are derived from these monomers. Examples 24 and 25 are comparison examples.

EXAMPLE 1

A two liter reactor heated by fluid circulation and equipped with a stirring system and an inert gas circulation system (nitrogen or argon) is filled with 550 g of benzyl alcohol and 450 g of a mixture of monomers (1) and (2) prepared by the method described at the start of Example 3 of U.S. Pat. No. 3,609,123. After stirring for 20 minutes at ambient temperature, the mixture is heated to 40° to 50° C. until complete dissolving occurs and then at 100° C. for 2 hours and finally at 120° C. for 90 minutes. After cooling to ambient temperature, the dynamic viscosity of the solution is 800 mPa.s. It is then transferred into a two liter bell filter and filtered on paper 1015 under a pressure of 2 bars in order to retain all the particles with a diameter larger than 5 μm. This first filtration is followed by a second filtration on a filter cartridge, which holds back all the particles with a diameter larger than 0.2 μm. Analysis of the composition shows that it contains 43% by weight of dry substance formed from approximately 75% of the mixture of monomers (1) and (2) and 25% of the oligomers of formula (3) with an average degree of polycondensation of 10. The film forming characteristics of the composition are determined by applying the following procedure. A wet polyimide precursor film is deposited on a glass plate with the aid of a filmograph having a 100 μm doctor opening. The glass plate is transferred into a forced ventilation oven, whose temperature is raised to 100° C. and maintained there for 1 hour. The oven temperature is raised to 200° C. with a 5° C. jump every minute and the film is left at this temperature for 2 hours. The process is repeated for a final treatment of 1 hour at 300° C. The film is separated from the glass support by immersing everything in tepid water for a few hours. The polyimide film is dried in vacuo at 150° C. to constant weight. The film obtained is flexible with a continuous surface free from defects or faults (pin holes, craters, cracks, etc.,). A study of this film by infrared spectroscopy shows the characteristic bands of imide cycles and the absence of significant absorption bands corresponding to the reactive functions of the monomers.

The smoothing properties are measured on silicon disks covered with a 2 μm thick copper coating. The set of steps which are etched in the copper coating by microlithography corresponds to a sequence of groups of parallel lines, whose width and spacing vary from 1 to 50 μm. Thus, the lines with a width of 1 μm are separated from one another by a space of 1 μm, whilst the wide lines of 2 μm are spaced by 2 μm and so on to 50 μm. The polyimide precursor composition is deposited on the silicon disk with the aid of a spinner, whose rotation speed is 4000 r.p.m. and for a period of 40 seconds. After baking the film according to the heating programm indicated hereinbefore, the smoothing degree is measured with a Tencor alpha-step profilometer. The smoothing degree varies from 0.95 on the group of 3 μm lines to 0.50 on the group of 50 μm lines for a polyimide film thickness of 4 μm.

The determination of the time stability of the polyimide precursor composition is carried out whilst keeping the product in hermetically sealed bottles, on the one hand at ambient temperature and on the other by placing them in a refrigerator at a temperature of approximately 5° C. These bottles are then used at regular intervals for producing smoothing layers under the conditions given hereinbefore. The polyimide precursor composition reveals no significant changes after storing for 6 months at ambient temperature and 1 year in the refrigerator.

EXAMPLES 2 TO 8

The experimental procedure of example 1 is repeated in order to prepare compositions, whose initial dry substance concentration varies from 30 to 70%, in order to determine the maximum concentration limit usable in the spinner deposition method. This limit is normally reached when the dynamic viscosity of the composition is approximately 1800 to approximately 4000 mPa.s. Above these values, it is normally preferable to use other deposition methods such as immersion, doctoring or screen process printing. The characteristics of the different compositions are given in Table 1.

TABLE 1

| Example | Weight in grammes | | Viscosity* |
|---|---|---|---|
| | Reagents | Solvent | Dynamic |
| 2 | 300 | 700 | 85 |
| 3 | 400 | 600 | 300 |
| 4 | 500 | 500 | 2100 |
| 5 | 550 | 450 | 14800 |
| 6 | 600 | 400 | 135000 |
| 7 | 650 | 350 | 985000 |
| 8 | 700 | 300 | 2000000 |

*in mPa · s at 25° C.

EXAMPLE 9

A mixture of 400 g of monomers (1) and (2) and 600 g of benzyl alcohol is heated for 1 hour at 100° C. and 7 hours at 120° C. to oligomerize the monomers. After cooling, the solution is poured into 5 liters of methanol with very strong stirring. The product which precipitates is washed several times with methanol and is then dried for 24 hours at 60° C. in vacuo. At the end of this operation, the analysis of the reaction medium by exclusion chromatography indicates that the average degree of polycondensation is close to 10 with a wide distribution of the molecular weights and essentially no monomers are present.

A composition is prepared by dissolving in 1 liter of benzyl alcohol, 200 g of the solid mixture of oligomers prepared hereinbefore and 800 g of the mixture of monomers (1) and (2). The reagents are dissolved by heating at 80° C. for 1 hour and at 100° C. for 1 hour. At the end of this operation, the dry substance content is approximately 49%. A film prepared in the manner indicated in Example 1 has good mechanical properties and a glass transition point of 250° C. The degree of smoothing, determined as in Example 1 is 95% on the 1 μm lines, 65% on the 5 μm lines and 49% on the 10 μm lines.

EXAMPLES 10 to 21

These examples demonstrate the particular function of the benzyl alcohol in the compositions according to the invention. Various polar organic solvents are used in place of said alcohol in order to prepare polyimide precursor compositions using the experimental conditions of example 1. The product quantities used in these examples are 40 g of the mixture of monomers (1) and (2) and oligomers (3) described in Example 1 and 60 g of solvent. As in Example 1, the solutions obtained are used for producing test films. The results of these tests are given in Table 2.

TABLE 2

Study of polycondensation solvents.

| Example | Solvent* | Film quality |
|---|---|---|
| 10 | Benzyl alcohol-cresol (60:40) | very good |
| 11 | Benzyl alcohol-methanol (80:20) | very good |
| 12 | Benzyl alcohol-diglyme (70:30) | very good |
| 13 | Benzyl alcohol-DMF (75:25) | good |
| 14 | Tetrahydrofurfuryl alcohol | craters |
| 15 | 2-methoxy ethanol | craters |
| 16 | Diglyme | craters |
| 17 | γ-butyrolactone | craters |
| 18 | Dimethyl formamide | milky |
| 19 | Dimethyl acetamide | milky |
| 20 | N-methyl pyrrolidone | milky |
| 21 | NMP-xylene (80:20) | milky |

*the composition of the solvent mixtures is given in % by weight.
NMP = N-methyl pyrrolidone,
DMF = dimethyl formamide and
cresol = synthetic meta-cresol.

This table shows that the benzyl alcohol-based compositions give better quality films than amide-type solvents, which lead to milky, opaque films with poor mechanical properties.

EXAMPLE 22

A polyimide precursor composition is prepared as in Example 1 replacing the benzyl alcohol by 550 g of 3-methyl benzyl alcohol. The dynamic viscosity of the solution at the end of the thermal oligomerization reaction is 770 mPa.s. The degree of softening obtained on the test silicon wafers is substantially identical to that in Example 1.

EXAMPLE 23

A polyimide precursor composition is prepared as in Example 1 replacing the benzyl alcohol by 550 g of 2-chlorobenzyl alcohol. The dynamic viscosity of the solution at the end of the thermal oligomerization reaction is 910 mPa.s. The degree of smoothing obtained on the test silicon wafers is substantially identical to that of Example 1.

COMPARATIVE EXAMPLE 24

A suspension of 450 g of the mixture of monomers (1) and (2) in 550 g of benzyl alcohol is vigorously stirred at ambient temperature for 3 hours. The mixture is then progressively heated to 60° C. and kept at this temperature for 3 hours until the reagents have completely dissolved. Gel permeation chromatographic analysis shows that under these conditions the quantity of oligomer of formula (3) is below 7% by weight. The solution, cooled and filtered to 0.2 μm, has a dynamic viscosity of 50 mPa.s. The films prepared with this composition and baked under the conditions of Example 1 are brittle and unusable as smoothing layers. Moreover, the composition is not very stable and the monomers start to precipitate from the reaction medium after roughly 4 days at ambient temperature or 2 days in a refrigerator.

COMPARATIVE EXAMPLE 25

A polyimide precursor composition is prepared by dissolving 100 g of the product of Example 9, which is a mixture of oligomers substantially free from monomers (1) and (2), in 50 g of N-methyl pyrrolidone and then adding 50 g of benzyl alcohol. The use of N-methyl pyrrolidone as the basic solvent is due to the fact that the product of Example 9 cannot be easily redissolved in benzyl alcohol in order to reach a dry substance concentration of 50%. The thus obtained composition has a dynamic viscosity of approximately 50000 mPa.s and cannot be deposited on silicon wafers with a spinner.

What we claim is:

1. A polyimide precursor composition, comprising
a) at least one compound of the formula

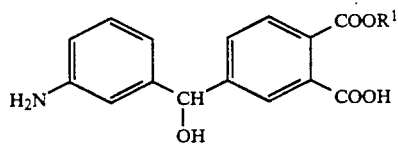

wherein $R^1$ represents a hydrocarbon group with 1 to 16 carbon atoms, b) at least one compound of the formula

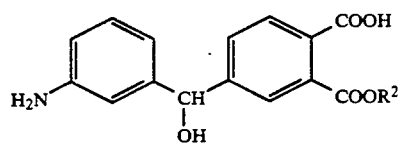

wherein $R^2$ represents a hydrocarbon group with 1 to 16 carbon atoms, c) at least one compound of the formula

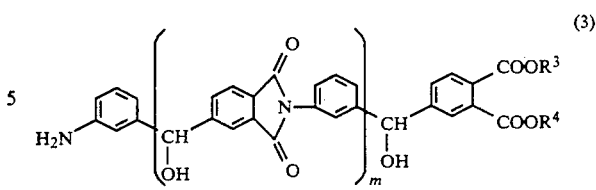

wherein m represents a number from 5 to 20, one of the groups $R^3$ and $R^4$ representing a hydrogen atom and the other representing a hydrocarbon group with 1 to 16 carbon atoms and d) at least one hydroxylated compound of the formula

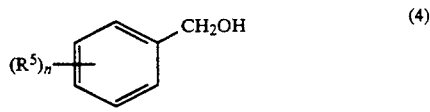

wherein $R^5$ represents a hydrogen atom, a halogen atom, a hydrocarbon group with 1 to 16 carbon atoms, or a group of formula $R^6$—O—, in which $R^6$ represents a hydrocarbon group with 1 to 16 carbon atoms and n is an integer form 1 to 5.

2. The composition according to claim 1, wherein the groups $R^1$, $R^2$ and one of the groups $R^3$ or $R^4$ each represent the same hydrocarbon group.

3. The composition according to claim 2, wherein the groups $R^1$, $R^2$ and one of the groups $R^3$ or $R^4$ each represent the same hydrocarbon group having 1 to 4 carbon atoms.

4. The composition according to claim 3, wherein the groups $R^1$, $R^2$ and one of the groups $R^3$ or $R^4$ each represent a methyl or ethyl group.

5. The composition according to claim 1, wherein the hydroxylated compound is chosen from the group consisting of benzyl alcohol, 2-methyl benzyl alcohol, 3-methyl benzyl alcohol, 4-isopropyl benzyl alcohol, 4-methoxy benzyl alcohol and 2-chloro benzyl alcohol.

6. The composition according to claim 1, containing approximately 30 to approximately 70% by weight of dry substance.

7. The composition according to claim 1, wherein the quantity of the compound of formula (3) is 10 to 50% by weight of dry substance based on the total dry substance weight.

8. The composition according to claim 1, further comprising 1 to 70% by weight, based on the weight of compound (4) contained in the composition, of at least one other alcohol, ether alcohol, ketone, ester, amide, heterocyclic compound, hydrocarbon, halogenated hydrocarbon or phenol compound chosen from the group consisting of methanol, ethanol, propanol, methoxyethyanol, 1,2-dimethoxy ethane, 2-ethoxyethanol, acetone, methyl ethyl ketone, acetophenone, ethylacetate, ethylbenzoate, dimethyl formamide, dimethyl acetamide, N-methyl pyrrolidone, caprolactam, butyrolactone, toluene, xylene, chlorobenzene, cresol, xylenol and monochlorophenol.

9. A coating comprising a composition of claim 1.

* * * * *